(12) United States Patent
Fuse et al.

(10) Patent No.: US 6,343,082 B1
(45) Date of Patent: Jan. 29, 2002

(54) VOICE TRANSMITTING APPARATUS, A VOICE TRANSMITTING METHOD, AND A VOICE BAND SIGNAL TRANSMITTING SYSTEM USING THE SAME APPARATUS OR THE SAME METHOD

(75) Inventors: Hidetoshi Fuse; Masashi Hayano, both of Yokohama; Toshiya Suganuma, Fujisawa; Takeshi Kawanobe, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/184,595

(22) Filed: Nov. 3, 1998

(30) Foreign Application Priority Data

Nov. 18, 1997 (JP) ............................................... 9-317252

(51) Int. Cl.⁷ .............................. H04J 3/17; H04J 3/24; H04J 3/12
(52) U.S. Cl. ........................ 370/433; 370/474; 370/528
(58) Field of Search ................................. 370/389, 464, 370/465, 468, 474, 493, 494, 495, 433, 435, 528

(56) References Cited

U.S. PATENT DOCUMENTS

| | | | |
|---|---|---|---|
| 5,404,573 A | * 4/1995 | Yabe et al. | 455/423 |
| 5,867,574 A | * 2/1999 | Eryilmaz | 379/389 |
| 5,870,397 A | * 2/1999 | Chauffour et al. | 370/435 |

FOREIGN PATENT DOCUMENTS

| | | |
|---|---|---|
| EP | 0464839 | 1/1992 |
| JP | A6105115 | 4/1994 |
| JP | A8146999 | 6/1996 |

OTHER PUBLICATIONS

WO 97 08871 A (Oonuki Masashi; Nakajima Akihisa (JP); Nakamura Hiroshi (JP); Mar. 6, 1997, and EP 0 810 757 A (Nippon Telegraph & Telephone), Dec. 3, 1997. (With abstract in English).

European Search Report EP 98 30 8988, Dec. 10, 1999.

* cited by examiner

Primary Examiner—Huy D. Vu
Assistant Examiner—Kevin C. Harper
(74) Attorney, Agent, or Firm—Stevens, Davis, Miller & Mosher, LLP

(57) ABSTRACT

A voice band signal is compression-encoded at a voice compression-encoding portion and is assembled into a cell at a cell assembling portion. Conversely, the voice band signal is disassembled at a cell disassembling portion and is decoded at a voice compression-decoding portion. When, from both of up and down data judging portions, receiving a judgement of coincidence of the voice band signal with a signal at the time when the line is unused, a timer counts a continuation time. When the continuation time exceeds a protection time, a protection time judging portion causes the cell assembling portion to stop the cell transmission. When, from either of the up and down data judging portions, receiving a judgement of no coincidence with the signal at the time when the line is unused, or when the continuation time does not exceed the protection time, the cell assembling portion is directed to transmit the cell.

9 Claims, 1 Drawing Sheet

VOICE TRANSMITTING APPARATUS, A VOICE TRANSMITTING METHOD, AND A VOICE BAND SIGNAL TRANSMITTING SYSTEM USING THE SAME APPARATUS OR THE SAME METHOD

BACKGROUND OF THE INVENTION

The present invention relates to a voice transmitting apparatus, which is provided between a switching device and a transmission path and performs cell assembly and cell disassembly of a voice band signal so as to transmit/receive the signal, a voice transmitting method, and a voice band signal transmitting system using the same apparatus or the same method.

Conventionally, when a voice band signal is transmitted/received, a single channel was assigned to the voice band signal on a single line with the use of time division multiplexing. In the time division multiplexing, since the channel is occupied even in a state of no calling, there occurred a waste of a transmission path. In order to utilize the transmission path effectively, highly effective compression-encoding and decoding of a voice are performed. The compression-encoded voice is then divided into frames, thus forming a cell as shown in FIG. 2. Also, in FIG. 2, reference numeral 1 designates the cell, numeral 2 designates a header area, and numeral 3 designates a data area. In transmitting/receiving the cell 1 formed in this way, the following method is being carried out: The cell 1 is forced not to be transmitted/received at the time of no sound in the voice band signal, thereby making the transmission path available for the other lines at the time of no calling and thus allowing the transmission efficiency to be statistically enhanced. However, concerning a voice band data signal in devices such as a facsimile and a modem, unlike the case of the voice band signal, the above-described method is incapable of performing the highly effective voice compression-encoding and of stopping the cell at the time of no sound. Accordingly, on a line for the voice band data signal in devices such as the facsimile and the modem, signaling information was referred to so as to carry out a process of stopping the cell transmission when the line is unused, thus intending to utilize the transmission path effectively.

However, in a voice transmitting apparatus which performs cell assembly and cell disassembly of the voice band signal constituted as described above and in a voice band signal transmitting system which has a switching device employing a common line signal system, when transmitting/receiving the voice band data signal in devices such as the facsimile and the modem, it is impossible to refer to the signaling information and thus the cell transmission is permitted to be continued even when the line is unused. This resulted in a problem that it is impossible to enhance utilization efficiency of the transmission path.

SUMMARY OF THE INVENTION

The present invention aims at solving the above-mentioned problem in the prior art. An object thereof is to provide a voice transmitting apparatus which, even when transmitting/receiving the voice band data signal in the voice band signal transmitting system using the switching device based on the common line signal system, makes it possible to stop the cell transmission when the line is unused and thus to enhance the utilization efficiency of the transmission path, a voice transmitting method, and a voice band signal transmitting system using the same apparatus and the same method.

In order to attain this object, a voice transmitting apparatus related with the present invention, which is employed in the voice transmitting apparatus, the voice transmitting method and the voice band signal transmitting system using the same apparatus and the same method, is characterized by comprising a cell assembling means for assembling a voice band signal, which is obtained from a switching device through a switching device interface means, into a cell so as to transmit the cell to a transmission path through a transmission path interface means, an up data judging means for judging, from the voice band signal, a line-unused time of signal which the switching device outputs when a line is unused, a cell disassembling means for disassembling the cell, which is received from the transmission path, back into the voice band signal again, a down data judging means for judging the line-unused time of signal from the voice band signal obtained from the cell disassembling means, a timer for counting a continuation time from the moment when both the up data judging means and the down data judging means judge that the line-unused time of signal coincides with the voice band signal, and a protection time judging means for judging a protection time, during which a continuity of the continuation time counted by the timer is monitored for a fixed time period, so as to control stopping of a cell transmission by means of the cell assembling means after a lapse of the protection time.

Also, the voice transmitting apparatus is characterized in that the above-described up data judging means and down data judging means judge data row, which is set arbitrarily based on characteristics of user data, as the line-unused time of signal.

Also, the voice transmitting apparatus is constituted so that the above-described protection time judging means, taking advantage of the protection time set arbitrarily based on characteristics of the user data, monitors the continuity of the continuation time which is counted by the timer in accordance with the judgement results obtained by the up data judging means and the down data judging means.

According to the above-mentioned constitution, the cell assembling means assembles a voice band signal, which is obtained from the switching device through the switching device interface means, into a cell so as to transmit the cell to the transmission path through the transmission path interface means, further the up data judging means judges, from the voice band signal, a line-unused time of signal which the switching device outputs when the line is unused, also the cell disassembling means disassembles the cell, which is received from the transmission path, back into the voice band signal again and transmits the voice band signal to the switching device, furthermore the down data judging means judges the line-unused time of signal from the voice band signal obtained from the cell disassembling means, the timer counts the continuation time in accordance with judgements made by both the up data judging means and the down data judging means concerning coincidence of the line-unused time of signal with the voice band signal, the protection time judging means judges the protection time, during which the continuity of the continuation time counted by the timer is monitored for a fixed time period, so as to control stopping of the cell transmission by means of the cell assembling means after a lapse of the protection time, and when either the up data judging means or the down data judging means judges a signal other than the line-unused time of signal from the voice band signal, it is possible to clear the continuation time counted by the timer and at the same time to control starting of the cell transmission by means of the cell assembling means with the use of the protection time judging means.

Also, a row of predetermined data bits acting as a signal indicative of a line-unused time, which is judged to coincide with the voice band signal, is set arbitrarily based on characteristics of the user data, thus making it possible to control stopping or starting of the cell transmission even if the voice compression system is altered or regardless of the presence or absence of the compression.

Also, the protection time in connection with the protection time judging means is set arbitrarily based on characteristics of the user data, thereby making it possible to stop the cell transmission when the line is unused and thus to aim at enhancing utilization efficiency of the transmission path.

Moreover, in the voice band signal transmitting system which has the switching device employing the common line signal system, even when transmitting/receiving the voice band data signal in devices such as the facsimile and the modem, the voice transmitting apparatus or the voice transmitting method makes it possible to stop the cell transmission when the line is unused and thus to enhance the utilization efficiency of the transmission path.

DESCRIPTION OF THE PREFERRED EMBODIMENTS

Referring to the accompanying drawings, the detailed description will be given below concerning an embodiment in the present invention.

Figure 1:
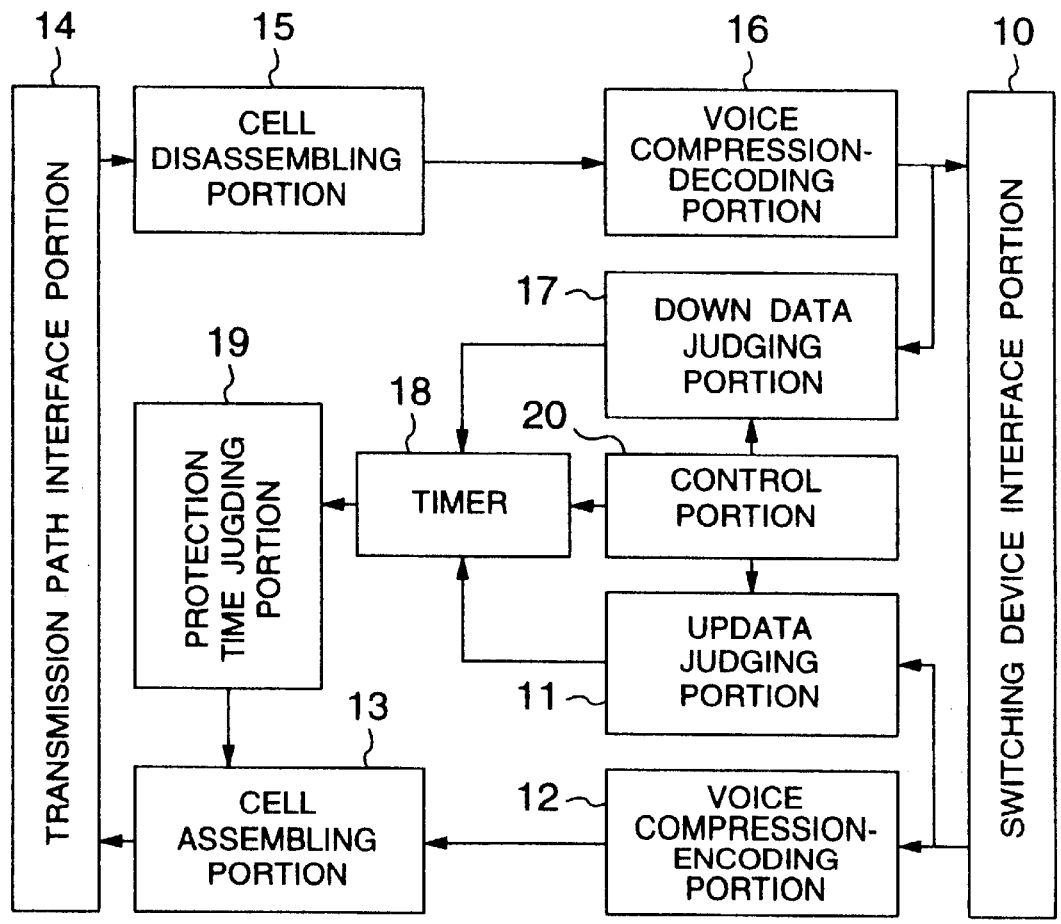
FIG. 1 is a block diagram for showing a schematic constitution of a voice transmitting apparatus, i.e. an embodiment in the present invention.
Figure 2:
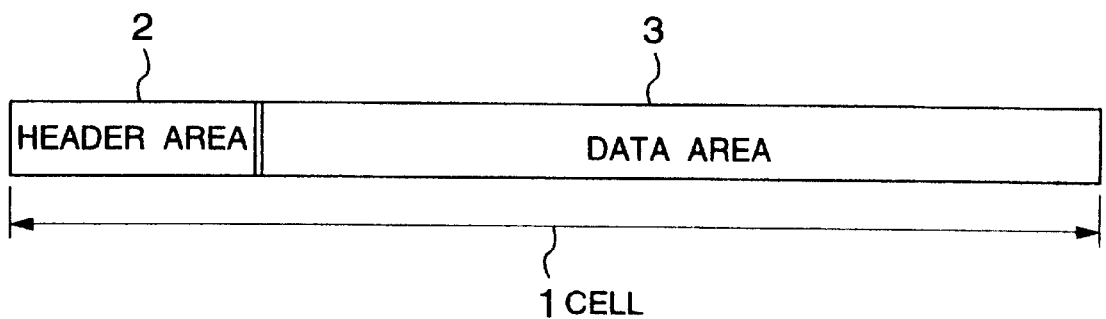
FIG. 2 is a diagram for showing a constitution example of the cell.

FIG. 1 is a block diagram for showing a schematic constitution of a voice transmitting apparatus, i.e. an embodiment in the present invention. In FIG. 1, reference numeral 10 designates a switching device interface portion for receiving a voice band signal from a switching device (not illustrated) and transmitting the voice band signal to the switching device, numeral 11 designates an up data judging portion for comparing a voice band signal, which is received from the switching device interface portion 10, with a signal which the switching device outputs when the line is unused, numeral 12 designates a voice compression-encoding portion which has a single or a plurality of voice compression systems so as to perform compression-encoding of the voice band signal or lets the voice band signal pass through just the way it is without compressing it, numeral 13 designates a cell assembling portion which constitutes a cell assembling means together with the voice compression-encoding portion 12 and divides voice compression-encoded signal into frames so as to assemble a cell to which a header, i.e. attendant information on the compression systems and so on, is added, numeral 14 designates a transmission path interface portion for transmitting/receiving the cell to and from a transmission path (not illustrated), numeral 15 designates a cell disassembling portion for disassembling the cell, which is received from the transmission path, into the attendant information and a voice compression signal, numeral 16 designates a voice compression-decoding portion which constitutes a cell disassembling means together with the cell disassembling portion 15, has a single or a plurality of voice compression systems, and in accordance with content of the header in the cell, switches the voice compression systems so as to perform compression-decoding of the voice compression signal, or lets the voice compression signal pass through just the way it is when it is not compressed, numeral 17 designates a down data judging portion for comparing an output signal from the voice compression-decoding portion 16 with the signal which the switching device outputs when the line is unused, numeral 18 designates a timer which, when it turns out that both of the judgement results obtained by the up data judging portion 11 and the down data judging portion 17 coincide with the signal at the time when the line is unused, counts the continuation time thereof, numeral 19 designates a protection time judging portion which compares the continuation time counted by the timer 18 with a protection time set in advance and, when value of the timer 18 turns out to be longer than the protection time, controls the cell assembling portion 13 to stop or to start the cell transmission, and numeral 20 designates a control portion which sets the protection time for the protection time judging portion 19 and, for the up data judging portion 11 and the down data judging portion 17 and as the signal which the switching device outputs when the line is unused, sets monitor object bits within the voice band signal (for example, PCM 8 bits) which is to become an object of the judgement.

Next, the description will be given below concerning operation of the above-described embodiment. First, in an initial state, the voice band signal received from the switching device interface portion 10 is compression-encoded by the voice compression-encoding portion 12 or is let to pass through just the way it is without being compressed, and is then divided by the cell assembling portion 13 into frames so as to assemble the cell to which the header, i.e. the attendant information on the compression systems and so on, is added, thus transmitting the cell to the transmission path interface portion 14. Also, the cell received from the transmission path interface portion 14 is disassembled into the attendant information and the voice compression signal by the cell disassembling portion 15. The voice compression signal is compression-decoded by the voice compression-decoding portion 16 or is let to pass through just the way it is when it is not compressed, thus outputting the voice band signal to the switching device interface portion 10.

The up data judging portion 11 compares the voice band signal, which is received from the switching device interface portion 10, with the line-unused time of signal from the switching device set by the control portion 20, and informs the timer 18 of the result of judgement on the comparison. Similarly, in the down data judging portion 17, too, the voice band signal outputted from the voice compression-decoding portion 16 is compared with the line-unused time of signal from the switching device set by the control portion 20. Compared in the comparison of this signal is only the monitor object bits within the PCM 8 bits which are to become an object of the judgement set by the control portion 20. The down data judging portion 17 informs the timer 18 of the result of judgement on the comparison.

When, from both the up data judging portion 11 and the down data judging portion 17, receiving a judgement notice of coincidence of the voice band signal with the line-unused time of signal from the switching device, the timer 18 counts up value of the timer 18 (the continuation time). Also, when, from either the up data judging portion 11 or the down data judging portion 17, receiving a judgement notice of no coincidence of the voice band signal with the line-unused time of signal from the switching device, the timer 18 clears the value of the timer 18.

The protection time judging portion 19 compares the protection time, which is set in advance by the control portion 20, with the value of the timer 18 and, when the value of the timer 18 has been counted up longer than the protection time, judges that the line is unused and directs the cell assembling portion 13 to stop the cell transmission. Also, when the value of the timer 18 does not exceed the protection time or the value of the timer 18 is cleared, the protection time judging portion 19 directs the cell assembling portion 13 to transmit the cell.

In a section to which there comes no received cell from the transmission path interface portion 14 on account of the stopping of the cell transmission, the voice compression-decoding portion 14 outputs a finally decoded voice band signal to the switching device interface portion 10. This makes it possible to prevent a data transmission error which occurs when a state, in which a voice band signal inputted from a terminal connected with the switching device coincides with the line-unused time of signal from the switching device, continues longer than the protection time and thus the cell transmission is stopped.

Also, a row of predetermined data bits acting as a signal indicative of a line-unused time, which is judged to coincide with the voice band signal in the up data judging portion 11 and the down data judging portion 17, is set arbitrarily based on characteristics of the user data, thus making it possible to control the stopping or the starting of the cell transmission even if the voice compression system is altered or regardless of the presence or absence of the compression.

Furthermore, the protection time, during which the protection time judging portion 19 monitors for a fixed time period the continuity of the continuation time obtained from the value of the timer 18, is set arbitrarily based on characteristics of the user data, thereby making it possible to stop the cell transmission when the line is unused and thus to aim at enhancing the utilization efficiency of the transmission path.

In the voice band signal transmitting system which has the switching device employing the common line signal system, even when transmitting/receiving the voice band data signal in devices such as the facsimile and the modem, the use of the voice transmitting apparatus constituted as described above or the voice transmitting method makes it possible to stop the cell transmission when the line is unused and thus to enhance the utilization efficiency of the transmission path.

As described above, the present invention brings about an effect that, with the use of the voice transmitting apparatus or the voice transmitting method, it is possible to stop the cell transmission when the line is unused and thus to enhance the utilization efficiency of the transmission path, even when transmitting/receiving the voice band data signal in devices such as the facsimile and the modem in the voice band signal transmitting system which has the switching device employing the common line signal system.

What is claimed is:

1. A voice transmitting apparatus, comprising:

cell assembling means for assembling a voice band signal, which is obtained from a switching device through switching device interface means, into a cell so as to transmit the cell to a transmission path through transmission path interface means, up data judging means for judging, from the voice band signal, a signal indicative of a line-unused time and outputted from the switching device when a line is unused, cell disassembling means for disassembling the cell, which is received from the transmission path, back into the voice band signal, down data judging means for judging the signal indicative of the line-unused time from the voice band signal obtained from said cell disassembling means, a timer for counting a continuation time from the moment when both of said up data judging means and said down data judging means judge the signal indicative of the line-unused time from the voice band signal, and protection time judging means for judging a protection time, during which a continuity of the continuation time counted by said timer is monitored for a fixed time period, so as to control stopping of transmission of the cell through said cell assembling means after a lapse of the protection time, wherein when either said up data judging means or said down data judging means judges a signal other than the signal indicative of the line-unused time from the voice band signal, the continuation time counted by said timer is cleared, and at the same time said protection time judging means controls starting transmission of the cell through said cell assembling means.

2. A voice transmitting apparatus as claimed in claim 1, wherein both of said up data judging means and said down data judging means judge a predetermined data bit, which is set arbitrarily based on characteristics of user data, as the signal indicative of the line-unused time.

3. A voice transmitting apparatus as claimed in claim 1, wherein said protection time judging means, depending on the protection time set arbitrarily based on characteristics of user data, monitors the continuity of the continuation time which is counted by said timer in accordance with results of the judgments made by said up data judging means and said down data judging means.

4. A voice transmitting method, comprising the steps of:

providing cell assembling means to assemble a voice band signal, which is obtained from a switching device through switching device interface means, into a cell so as to transmit the cell to a transmission path through transmission path interface means, providing up data judging means to judge, from the voice band signal, a signal indicative of a line-unused time and outputted from the switching device when a line is unused, providing cell disassembling means to disassemble the cell, which is received from the transmission path, back into the voice band signal and to transmit the voice band signal to the switching device, providing down data judging means to judge the signal indicative of the line-unused time from the voice band signal obtained from said cell disassembling means, providing a timer to count a continuation time from the time when both of said up data judging means and said down data judging means judge the signal indicative of the line-unused time of signal from the voice band signal, providing protection time judging means to judge a protection time during which a continuity of the continuation time is monitored for a fixed time period, controlling stopping of transmission of the cell through said cell assembling means after a lapse of the protection time, clearing the continuation time counted by said timer when either said up data judging means or said down data judging means judges a signal other than the signal indicative of the line-unused time from the voice band signal, and providing said protection time judging means to control starting of transmission of the cell through said cell assembling means.

5. A voice transmitting method according to claim 4, wherein, in said up data judging means and said down data judging means, a step is performed of setting, arbitrarily and based on characteristics of user data, a predetermined data bit judged as the signal indicative of the line-unused time.

6. A voice transmitting method as claimed in claim 4, which, in said protection time judging means, comprises a step of setting, arbitrarily and based on characteristics of user data, the protection time during which the continuity of the continuation time is monitored for a fixed time period, the continuation time being counted by said timer in accordance with results of the judgements made by said up data judging means and said down data judging means.

7. A voice band signal transmitting system which comprises a voice transmitting apparatus including:

a switching device in which a common line signal system is employed, cell assembling means for assembling a voice band signal, which is obtained from said switching device through switching device interface means, into a cell so as to transmit the cell to a transmission path through transmission path interface means, up data judging means for judging, from the voice band signal, the signal indicative of a line-unused time and outputted from said switching device when a line is unused, cell disassembling means for disassembling the cell, which is received from the transmission path, back into the voice band signal, down data judging means for judging the signal indicative of the line-unused time from the voice band signal obtained from said cell disassembling means, a timer for counting a continuation time from the moment when both of said up data judging means and said down data judging means judge the signal indicative of the line-unused time from the voice band signal, and protection time judging means for judging a protection time, during which a continuity of the continuation time counted by said timer is monitored for a fixed time period, so as to control stopping of transmission of the cell through the cell assembling means after a lapse of said protection time.

8. A voice band signal transmitting system as claimed in claim 7, wherein said up data judging means and said down data judging means which are included in said voice transmitting apparatus judge a predetermined data bit, which is set arbitrarily based on characteristics of user data, as the signal indicative of the line-unused time.

9. The voice band signal transmitting system as claimed in claim 7, wherein said protection time judging means which is included in said voice transmitting apparatus, depending on the protection time set arbitrarily based on characteristics of user data, monitors the continuity of the continuation time which is counted by said timer in accordance with results of the judgments made by said up data judging means and said down data judging means.

* * * * *